US008932775B2

(12) United States Patent
Hamada et al.

(10) Patent No.: US 8,932,775 B2
(45) Date of Patent: Jan. 13, 2015

(54) METHOD AND APPARATUS FOR CONTROLLING THE OPERATION OF A FUEL CELL

(75) Inventors: Shigetaka Hamada, Aichi Pref (JP); Robert M. Darling, South Windsor, CT (US); Shampa Kandoi, Rocky Hill, CT (US)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 715 days.

(21) Appl. No.: 12/801,239

(22) Filed: May 28, 2010

(65) Prior Publication Data
US 2011/0294026 A1 Dec. 1, 2011

(51) Int. Cl.
*H01M 8/04* (2006.01)
*H01M 8/10* (2006.01)

(52) U.S. Cl.
CPC ...... *H01M 8/04649* (2013.01); *H01M 8/04388* (2013.01); *H01M 8/04559* (2013.01); *H01M 8/04589* (2013.01); *H01M 8/04753* (2013.01); *H01M 8/0485* (2013.01); *H01M 2008/1095* (2013.01); *Y02E 60/50* (2013.01)
USPC ............................ 429/432; 429/413; 429/444

(58) Field of Classification Search
USPC ................................................. 429/400–535
See application file for complete search history.

(56) References Cited

U.S. PATENT DOCUMENTS

| | | | |
|---|---|---|---|
| 3,471,337 A | 10/1969 | Fetterman | |
| 5,935,726 A | 8/1999 | Chow et al. | |
| 5,998,054 A | 12/1999 | Jones et al. | |
| 5,998,058 A | 12/1999 | Fredley | |
| 6,103,412 A | 8/2000 | Hirano et al. | |
| 6,258,198 B1 | 7/2001 | Saito et al. | |
| 6,258,476 B1 | 7/2001 | Cipollino | |
| 6,284,399 B1 | 9/2001 | Oko et al. | |
| 6,376,110 B1 | 4/2002 | Koschany | |
| 6,376,111 B1 * | 4/2002 | Mathias et al. | 429/413 |
| 6,709,777 B2 | 3/2004 | Hagans et al. | |
| 6,753,106 B2 | 6/2004 | Chow et al. | |
| 6,841,283 B2 | 1/2005 | Breault | |
| 7,112,379 B2 | 9/2006 | Skiba | |

(Continued)

FOREIGN PATENT DOCUMENTS

| | | |
|---|---|---|
| JP | 07-235324 | 9/1995 |
| JP | 2007-149572 | 6/2007 |

OTHER PUBLICATIONS

International Search Report and the Written Opinion of the International Search Authority, for PCT/US2011-037516, dated May 23, 2011.

*Primary Examiner* — Kenneth Douyette
*Assistant Examiner* — James Lee
(74) *Attorney, Agent, or Firm* — Finnegan, Henderson, Farabow, Garrett & Dunner, LLP

(57) ABSTRACT

A fuel cell system includes a fuel cell, a controller, a resistance sensor, and a regulator. The fuel cell has a cathode plate, an anode plate, and an ion-exchange membrane interposed between the cathode plate and the anode plate. The controller is for controlling a gas flow rate to the anode plate. The resistance sensor is coupled to the fuel cell for measuring a resistance of the fuel cell. The regulator is coupled to the controller and coupled to the anode plate for regulating the gas flow to the anode plate. The controller receives a signal from the resistance sensor and is configured to control the regulator to adjust the gas flow to the anode plate based on the signal from the resistance sensor.

15 Claims, 4 Drawing Sheets

(56) References Cited

U.S. PATENT DOCUMENTS

| | | |
|---|---|---|
| 7,132,192 B2 | 11/2006 | Muthuswamy et al. |
| 2002/0009623 A1* | 1/2002 | St-Pierre et al. ............... 429/13 |
| 2002/0150802 A1* | 10/2002 | Imamura et al. ............... 429/24 |
| 2005/0053814 A1* | 3/2005 | Imamura et al. ............... 429/22 |
| 2005/0147853 A1 | 7/2005 | Kaufmann et al. |
| 2005/0158610 A1 | 7/2005 | Keegan |
| 2005/0260463 A1* | 11/2005 | Chapman et al. ............... 429/13 |
| 2006/0008695 A1 | 1/2006 | Bai et al. |
| 2007/0259256 A1* | 11/2007 | Le Canut et al. ............... 429/90 |
| 2008/0138689 A1* | 6/2008 | Leo et al. ............... 429/34 |

\* cited by examiner

METHOD AND APPARATUS FOR CONTROLLING THE OPERATION OF A FUEL CELL

TECHNICAL FIELD

The present disclosure relates generally to a fuel cell system, and more particularly, to a method and apparatus for controlling the operation of a fuel cell.

BACKGROUND

A proton exchange membrane (PEM) fuel cell, also known as a polymer electrolyte membrane (PEM) fuel cell, uses fuel, e.g., hydrogen, and oxidant, e.g., oxygen from the air, to produce electricity, by transforming the chemical energy liberated during the electrochemical reaction of the fuel and oxygen to electrical energy. A PEM fuel cell generally employs a membrane electrode assembly (MEA). The membrane electrode assembly (MEA) includes a PEM disposed between two electrically conductive electrode plates, an anode plate and a cathode plate. The anode plate may include an anode gas diffusion layer and an anode catalyst layer. The cathode plate may include a cathode catalyst layer and a cathode gas diffusion layer. The electro-catalyst is typically disposed at each membrane/electrode plate interface to induce the desired electrochemical reaction. Each electrode plate includes a fluid flow field for directing the fuel and the oxidant to the respective electro-catalyst layers, specifically, at an anode on the fuel side and at a cathode on the oxidant side.

The fuel flow field directs a fuel stream to the anode. The fuel stream migrates through the porous anode gas-diffusion layer, and is oxidized at the anode electro-catalyst layer. The oxidant flow field directs an oxidant stream to the cathode. The oxidant stream migrates through the porous cathode gas-diffusion layer and is reduced at the cathode electro-catalyst layer. In a PEM fuel cell that uses hydrogen as fuel, the hydrogen is oxidized at the anode to produce protons. The protons migrate through the MEA and react at the cathode with an oxidant such as oxygen to produce water as the reaction products.

The water produced by the reaction may accumulate at the cathode, due to the electro-osmotic drag of water molecules by the protons passing from the anode through the MEA to the cathode. This water is commonly referred to as "proton drag water." The proton drag of water from the anode to the cathode results in a lower water concentration on the anode side of the PEM compared to the cathode side. If the PEM does not remain highly saturated with water, the PEM resistance increases, and the power obtained from the fuel cell decreases. At the cathode, the accumulated water may impede and could prevent oxygen from reacting with the protons ions and electrons. Accumulation of water in the cathode thus also reduces the electric potential created across the fuel cell, thereby limiting the fuel cell's performance. Therefore, it is desirable to promptly move the water from the cathode side to the anode side.

The disclosed system is directed to overcoming one or more of the problems set forth above.

SUMMARY

According to one aspect, the present disclosure is directed to a fuel cell system. The fuel cell system includes a fuel cell, a controller, a resistance sensor, and a regulator. The fuel cell has a cathode plate, an anode plate, and an ion-exchange membrane interposed between the cathode plate and the anode plate. The controller is for controlling a gas flow rate to the anode plate. The resistance sensor is coupled to the fuel cell for measuring a resistance of the fuel cell. The regulator is coupled to the controller and coupled to the anode plate for regulating a gas flow rate to the anode plate. The controller receives a signal from the resistance sensor and is configured to control the regulator to adjust the gas flow rate to the anode plate based on the signal from the resistance sensor.

According to another aspect, the present disclosure is directed to a method of improving performance of a fuel cell system. The method includes measuring a voltage across the fuel cell, measuring a resistance of the fuel cell, and increasing an anode gas flow rate of the fuel cell at times when increasing the anode gas flow rate lowers the resistance.

According to yet another aspect, the present disclosure is directed to a method of improving performance of a fuel cell system. The method includes measuring a voltage across the fuel cell, measuring a resistance of the fuel cell, and increasing an anode gas flow rate of the fuel cell. At times when increasing the anode gas flow rate lowers the resistance, the method further includes continuing to increase the anode gas flow rate.

DETAILED DESCRIPTION

Figure 1:
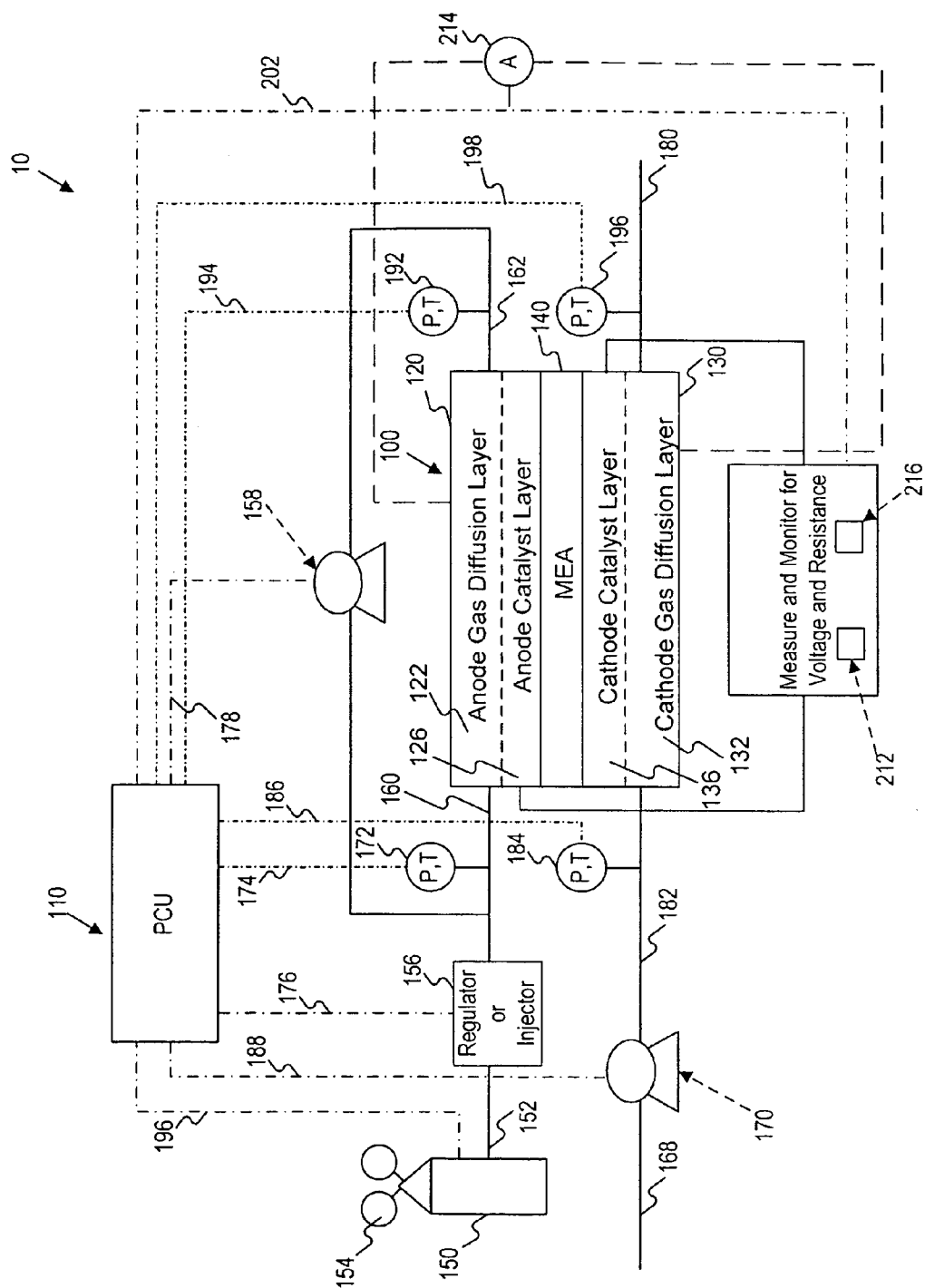
FIG. 1 is a diagram of a fuel cell power plant according to one embodiment of the invention.

FIG. 1 broadly depicts a perspective view of a PEM fuel cell power plant 10. A PEM fuel cell power plant 10 typically includes a plurality of fuel cells, which are electrically connected in series and referred to as a fuel cell assembly. For the purpose of simplicity in explaining the present invention, FIG. 1 shows the fuel cell power plant 10 only includes one fuel cell 100, but it should be understood that the fuel cell power plant 10 may include a predetermined number of fuel cells 100.

As shown in FIG. 1, the fuel cell 100 includes an anode plate 120, a cathode plate 130, and a membrane electrolyte assembly (MEA) 140 disposed between the anode plate 120 and the cathode plate 130. The anode plate 120 includes an anode gas diffusion layer 122 and an anode catalyst layer 126. The cathode plate 130 includes a cathode gas diffusion layer 132 and a cathode catalyst layer 136. A fuel reactant gas tank 150 supplies the anode plate 120 with fuel reactant gas through a fuel reactant gas stream 152. The fuel reactant gas may be hydrogen or any other suitable fuel gas. The fuel gas tank 150 may be a pressurized container. The fuel reactant gas tank 150 may include a valve 154 for controlling the flow of the fuel reactant gas. The valve 154 may be a variable valve, which is operable to regulate the pressure of the fuel reactant gas flow as it enters the anode plate 120. The PEM fuel cell power plant 10 further includes a controller 110 for controlling a gas flow rate to the anode plate and/or cathode plate. The controller 110 may include a microprocessor. The variable valve 154 may be controlled by the system controller 110.

The fuel reactant gas stream 152 may include a regulator or injector 156 for regulating the flow of the fuel reactant gas into the anode plate 120 of the fuel cell 100. The regulator 156 may be a pressure regulator. The anode plate 120 has an input channel 160 and an output channel 162. The fuel reactant gas is fed into the anode plate 120 through the input channel 160. The fuel reactant stream migrates through the porous anode gas-diffusion layer 122, and is oxidized at the anode electro-catalyst layer 126. The fuel reactant pressure is monitored by a pressure transducer 172 and a pressure transducer 192. The pressure transducer 172 is disposed at the input channel 160 and connected to the system controller 110. The pressure transducer 192 is disposed at the output channel 162 and connected to the system controller 110. The pressure transducer 172 measures the pressure of the fuel reactant gas stream before it enters the anode plate 120. The pressure transducer 192 measures the pressure of the fuel reactant gas stream after it exits the anode plate 120. The pressure transducer 172 and the pressure transducer 192 may be connected to the controller 110 via lines 174 and 194 respectively.

The fuel cell 100 may include a second regulator for regulating the flow of the fuel reactant gas into the anode plate 120, which may be embodied as a gas compressor or a recycle blower 158. The gas compressor 158 is connected to the input channel 160 and the output channel 162 of the anode plate 120. The gas compressor 158 compresses the reactant gas output from the output channel 162 (which was not consumed in the fuel cell 100) and recirculates it back to the input channel 160. The gas compressor 158 facilitates in controlling the pressure in the input channel 160. The total pressure at the input channel 160 may be regulated by the regulator 156 and the gas compressor 158. For example, if the compressor 158 is a fixed rate pump, the regulator 156 may be used to vary the fuel reactant gas pressure in the event that pressure adjustments are necessary. The regulator 156 and the gas compressor 158 may be connected to the controller 110 via lines 176 and 178 respectively. Fuel reactant gas stream pressure input from the pressure transducer 172 and from the pressure transducer 192 may cause the controller 110 to regulate the regulator 156 and/or the compressor 158 when necessary to achieve a target fuel reactant gas stream pressure. The fuel reactant gas flow rate can be changed by using one or both the regulator 156 and the compressor 158. For example, the controller 110 can control the flow rate by changing how wide the regulator 156 opens and the rotation rate of the compressor 158.

An oxidant reactant gas stream 168 supplies the cathode plate 130 with an oxidant reactant gas. The oxidant reactant gas is delivered to the cathode plate 130 through an oxidant gas stream 182. The oxidant stream migrates through the porous cathode gas-diffusion layer 132 and is reduced at the cathode electro-catalyst layer 136. The oxidant gas stream 182 may contain a variable pressure regulating valve or an air compressor 170 and a pressure transducer 184 which measures the pressure of the oxidant gas stream as it enters the cathode plate 130. The oxidant reactant gas exits from the cathode plate 130 through a pipe 180. The pipe 180 may contain a downstream pressure transducer 196 which measures the pressure of the oxidant gas stream as it exits from the cathode plate 130. The pipe 180 may contain a purge valve to control the oxidant gas stream as it exits from the cathode plate 130. The pressure transducer 184 may be connected to the system controller 110, for example, by a line 186, and the pressure transducer 196 may be connected to the system controller 110, for example, by a line 198. The controller 110 can make appropriate corrections in the oxidant reactant pressure when system operating conditions so dictate by controlling the compressor 170.

Figure 4:
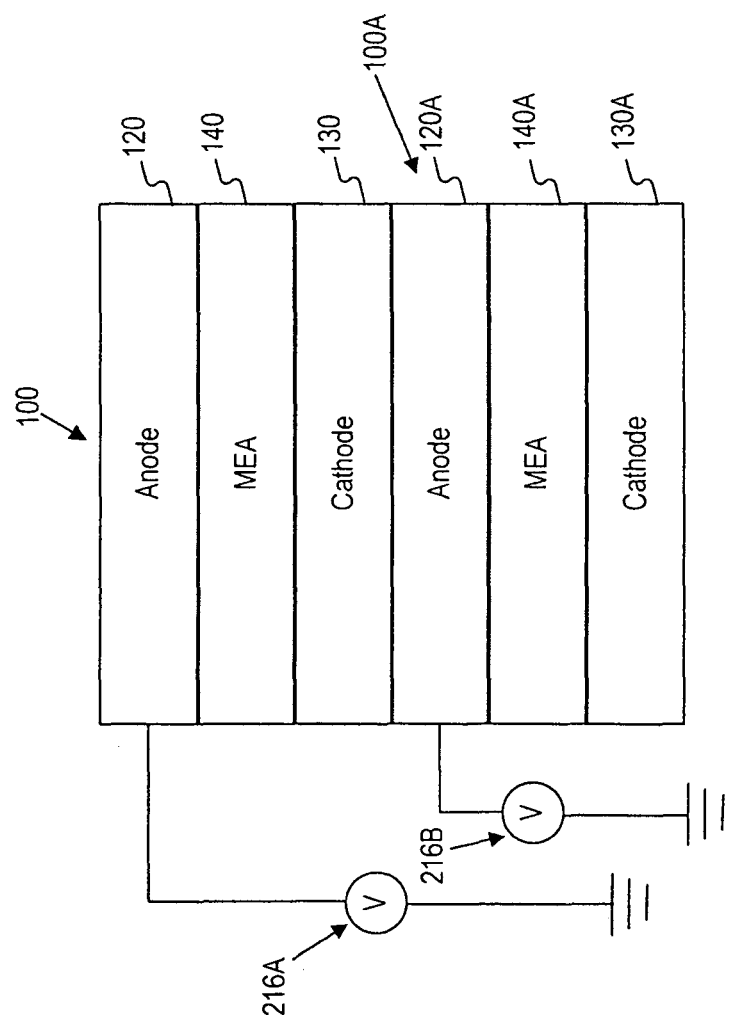
FIG. 4 is a schematic view of two fuel cells.

As shown in FIG. 1, in some exemplary embodiments, a voltage sensor 212 is disposed coupled to the fuel cell 100 for measuring the voltage of the fuel cell. A resistance sensor 216 is coupled to the fuel cell 100 for measuring the resistance of the fuel cell. The voltage sensor 212 and the resistance equipment 216 send voltage and resistance data to the system controller 110, for example, by a line 202. In some embodiments as shown in FIG. 4, the system may include two voltage sensors 216A and 216B. The voltage sensor 216A measures the voltage of the anode plate 120 of the fuel cell 100 and the voltage sensor 216B measures the voltage of an anode plate 120A of an adjacent fuel cell 100A. The voltage of the fuel cell 100 can be calculated by the two voltages measured by the two voltage sensors 216A and 216B. In some embodiments, the controller 110 may include a calculator to calculate resistance based on the voltage from the voltage sensor 212 and the current from a current sensor 214.

The controller 110 performs various control in the fuel cell system. The controller 110 may send control signals to the regulator 156 disposed on the fuel supply stream 152 to control how wide the regulator 156 opens. The controller 110 may also send control signals to the fuel compressor 158 to control how fast the compressor 158 rotates. By increasing or decreasing the width of the regulator 156 and/or by increasing or decreasing the rotation rate of the fuel compressor 158, the controller 110 may control the anode flow rate.

In operation, the controller 110 (e.g., initiated by an operator) can change anode gas flow rate and monitor the fuel cell's resistance and voltage. If increasing the anode gas flow rate can lower the resistance and increase the fuel cell voltage, the controller is configured to continue to increase the anode gas flow rate. At this time, the extra gas flow at the anode plate assists to move the water from the cathode to the anode and thereby hydrate the membrane, and improve the performance of the fuel cell. The anode gas flow rate can be increased up to a point where there is no substantial change of the resistance and cell voltage. Once higher resistance and lower voltage are observed, the anode flow rate can be decreased. The anode flow rate is controlled to keep the resistance low to achieve associated uniform hydration of the membrane, so that the durability of the fuel cell is increased. The controller 110 can be configured to automatically perform the above adjustments to maintain a high performance of the fuel cell. Alternatively, an operator may operate the controller 100 to perform the above-described adjustments.

In a PEM fuel cell that uses hydrogen as fuel, the hydrogen is oxidized at the anode to produce protons. The protons migrate through the MEA and react at the cathode with an oxidant such as oxygen to produce water as the reaction products. Effectively controlling the anode gas flow rate can also improve the performance of the fuel cell in a freezing condition. When the anode flow rate is increased, the water can be moved from the cathode side to the anode side through the membrane and that can hydrate the membrane, so that the fuel cell maintains high performance under a freezing condition.

Figure 2:
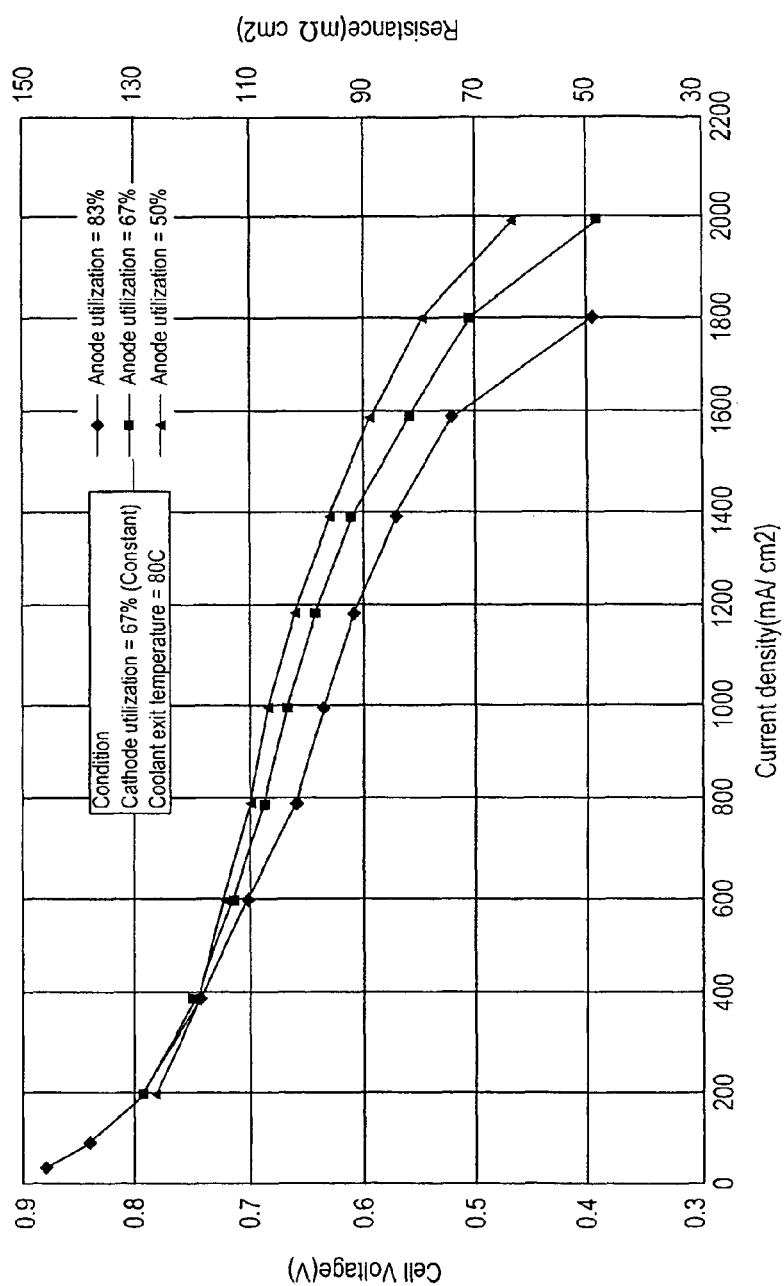
FIG. 2 is a comparative graph of the current density versus the cell voltage for various fuel cells having different anode gas utilization rate.

FIG. 2 depicts a graph of the current density versus the cell voltage for the fuel cell with various anode utilization. The fuel cell has a constant cathode utilization rate, which is about 67%, and the coolant exit temperature is about 80° C. The various anode utilization rates illustrate how altering the anode flow rate affects the fuel cell's performance. The fuel cell configurations are designated by the symbols, ♦, ■, and ▲. The fuel cell designated by the symbol ♦ has an anode utilization rate of about 83%. The fuel cell designated by the symbol ■ has an anode utilization rate of about 67%. The fuel cell designated by the symbol ▲ has an anode utilization rate of about 50%. As seen in FIG. 2, when the anode gas flow rate is increased (i.e., the anode utilization rate is decreased, e.g., from 83% to 67% and then to 50%), the fuel cell achieves a higher cell voltage. The anode gas flow rate can be increased up to a point where there is no substantial change of cell voltage. Once a lower voltage is observed, the anode flow rate can be decreased. The anode flow rate is controlled to keep the voltage high. When the anode flow rate is increased, the water can be moved from the cathode side to the anode side through the membrane and the water can hydrate the membrane, so that the fuel cell maintains a high performance.

Figure 3:
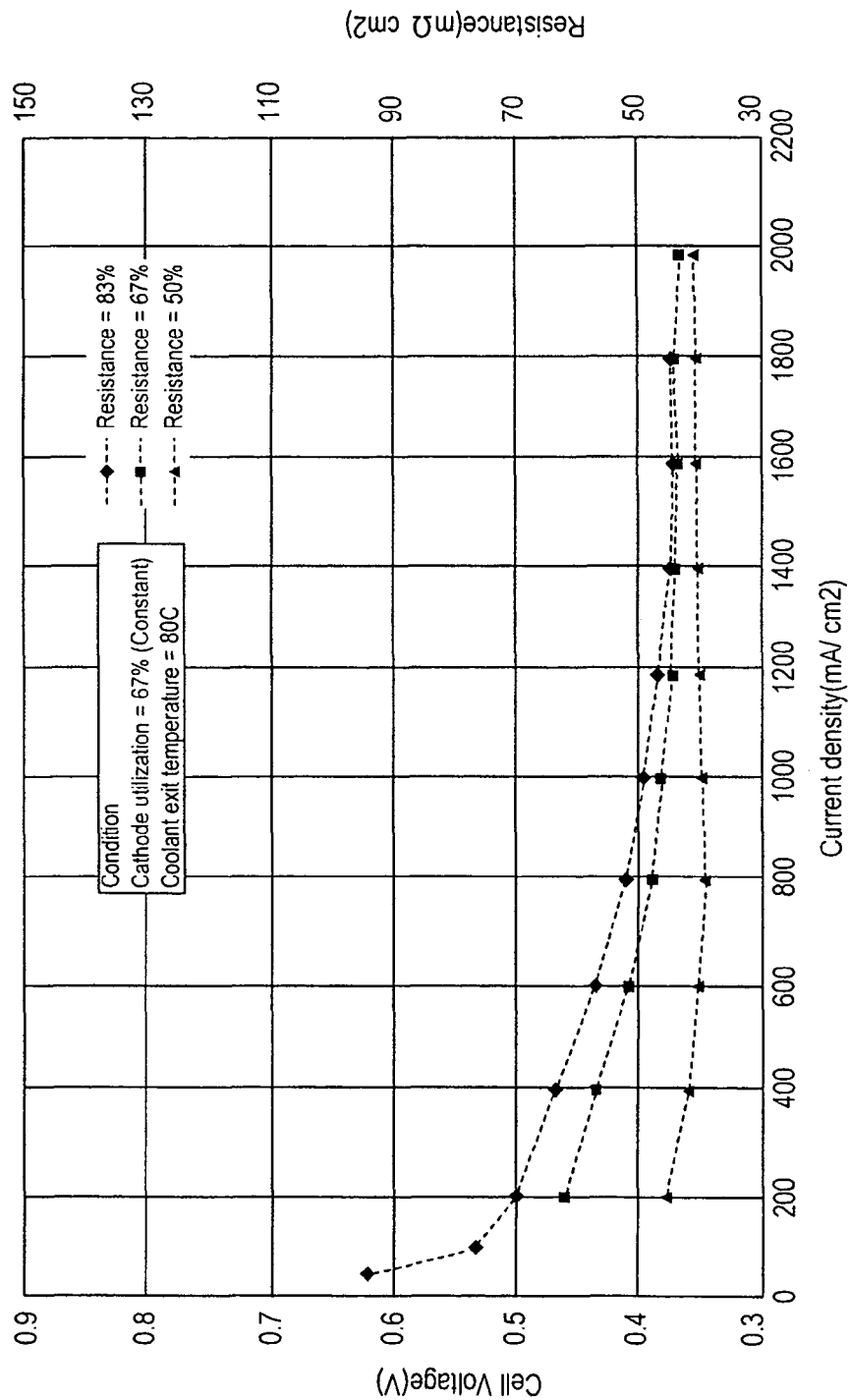
FIG. 3 is a comparative graph of the current density versus the cell resistance for various fuel cells having different anode gas utilization rate.

FIG. 3 depicts a graph of the current density versus the resistance for the fuel cell with various anode utilization. The fuel cell has a constant cathode utilization rate, which is about 67%, and the coolant exit temperature is about 80° C. The various anode utilization rates illustrate how altering the anode flow rate affects the fuel cell's performance. The fuel cell configurations are designated by the symbols, ♦, ■, and ▲. The fuel cell designated by the symbol ♦ has an anode utilization rate of about 83%. The fuel cell designated by the symbol ■ has an anode utilization rate of about 67%. The fuel cell designated by the symbol ▲ has an anode utilization rate of about 50%. When the anode gas flow rate is increased (i.e., the anode utilization rate is decreased, e.g., from 83% to 67% and then to 50%), the fuel cell achieves a lower resistance. The anode gas flow rate can be increased up to a point where there is no substantial change of the resistance. Once a higher resistance is observed, the anode flow rate can be decreased. The anode flow rate is controlled to keep the resistance low to achieve associated uniform hydration of the membrane, so that the durability of the fuel cell is maintained at a high level.

It will be apparent to those skilled in the art that various modifications and variations can be made to the fuel cell system. Other embodiments will be apparent to those skilled in the art from consideration of the specification and practice of the disclosed fuel cell system. It is intended that the specification and examples be considered as exemplary only, with a true scope being indicated by the following claims and their equivalents.

What is claimed is:

1. A fuel cell system comprising:
a fuel cell having a cathode plate, an anode plate, and an ion-exchange membrane interposed between the cathode plate and the anode plate;
a controller for controlling a gas flow rate to the anode plate;
a resistance sensor coupled to the fuel cell for measuring a resistance of the fuel cell; and
a first regulator coupled to the controller and coupled to the anode plate for regulating the gas flow to the anode plate, wherein the first regulator is a pressure regulator, and wherein the controller receives a signal from the resistance sensor and is programmed to hydrate the ion-exchange membrane by controlling the first regulator to increase the gas flow rate to the anode plate based on the signal.

2. The fuel cell system according to claim 1, further comprising a voltage sensor coupled to the fuel cell for measuring a voltage of the fuel cell, wherein the controller is programmed to control the regulator to adjust the gas flow rate to the anode plate based on the measured voltage.

3. The fuel cell system according to claim 2, wherein the controller is programmed to control the first regulator to increase the anode gas flow rate at times when increasing the anode gas flow rate increases the voltage of the fuel cell.

4. The fuel cell system according to claim 2, wherein the controller is programmed to control the regulator to increase the anode gas flow rate at times when increasing the anode gas flow rate increases the voltage of the fuel cell, and wherein the controller is programmed to increase the anode gas flow rate until a point where increasing the anode gas flow rate does not cause change of the voltage.

5. The fuel cell system according to claim 2, further comprising:
an additional fuel cell having a cathode plate, an anode plate, and an ion-exchange membrane interposed between the cathode plate and the anode plate of the additional fuel cell; and
an additional voltage sensor, wherein the voltage sensor is configured to measure the voltage of the anode plate of the fuel cell, and wherein the additional voltage sensor is configured to measure a voltage of the anode plate of the additional fuel cell.

6. The fuel cell system according to claim 1, wherein the controller is programmed to control the first regulator to increase the anode gas flow rate at times when increasing the anode gas flow rate lowers the resistance of the fuel cell.

7. The fuel cell system according to claim 1, wherein the controller is programmed to control the regulator to increase the anode gas flow rate at times when increasing the anode gas flow rate lowers the resistance of the fuel cell, and wherein the controller is programmed to increase the anode gas flow rate until a point where increasing the anode gas flow rate does not cause change of the resistance.

8. The fuel cell system according to claim 1, wherein the controller is programmed to control the first regulator to decrease the anode gas flow rate at times when increasing the anode gas flow rate increases the resistance of the fuel cell.

9. The fuel cell system according to claim 1, wherein the first regulator includes an injector coupled to an input of the anode plate of the fuel cell.

10. The fuel cell system according to claim 1, wherein the first regulator includes a gas compressor coupled between an output and an input of the anode plate of the fuel cell.

11. The fuel cell system according to claim 1, further comprising a second regulator, which includes a gas compressor disposed between an output and an input of the anode plate of the fuel cell, wherein the gas compressor is coupled to the controller.

12. The fuel cell system according to claim 11, wherein the controller is programmed to increase a rotation rate of the gas compressor to increase the anode gas flow rate.

13. The fuel cell system according to claim 1, wherein the anode plate further comprises an anode gas diffusion layer and an anode catalyst layer.

14. The fuel cell system according to claim 1, wherein the cathode plate further comprises a cathode gas diffusion layer and a cathode catalyst layer.

15. The fuel cell system according to claim 1, wherein the controller is programmed to hydrate the ion exchange membrane by increasing a width of the first regulator.

* * * * *